(12) United States Patent
Nelson et al.

(10) Patent No.: US 10,584,830 B2
(45) Date of Patent: Mar. 10, 2020

(54) APPARATUS, SYSTEM AND METHOD FOR THE CAPTURE, UTILIZATION AND SENDOUT OF LATENT HEAT IN BOIL OFF GAS ONBOARD A CRYOGENIC STORAGE VESSEL

(71) Applicant: Excelerate Energy Limited Partnership, The Woodlands, TX (US)

(72) Inventors: Kenneth D. Nelson, The Woodlands, TX (US); Graeme David Trotter, Edinburgh (GB); Alan B. Nierenberg, Cooper Landing, AK (US); Kenneth Hugh McGeachie, Montgomery, TX (US)

(73) Assignee: Excelerate Energy Limited Partnership, The Woodlands, TX (US)

( * ) Notice: Subject to any disclaimer, the term of this patent is extended or adjusted under 35 U.S.C. 154(b) by 0 days.

(21) Appl. No.: 16/295,759

(22) Filed: Mar. 7, 2019

(65) Prior Publication Data

US 2019/0203884 A1 Jul. 4, 2019

Related U.S. Application Data

(62) Division of application No. 15/024,285, filed as application No. PCT/US2014/057683 on Sep. 26, 2014, now Pat. No. 10,267,457.

(Continued)

(51) Int. Cl.
*F17C 9/04* (2006.01)
*F17C 7/04* (2006.01)
(Continued)

(52) U.S. Cl.
CPC ............... *F17C 9/04* (2013.01); *B63B 25/16* (2013.01); *F17C 7/02* (2013.01); *F17C 9/02* (2013.01);
(Continued)

(58) Field of Classification Search
CPC ........ F17C 7/02; F17C 7/04; F17C 2221/033; F17C 2227/0339; F17C 2227/039;
(Continued)

(56) References Cited

U.S. PATENT DOCUMENTS

2008/0276627 A1* 11/2008 Lee ........................... F17C 9/02
62/7
2011/0056238 A1* 3/2011 Mak .......................... F17C 9/04
62/614

* cited by examiner

Primary Examiner — Keith M Raymond
(74) Attorney, Agent, or Firm — Frederic Dorwart, Lawyers PLLC; Penina Michlin Chiu

(57) ABSTRACT

An apparatus, system and method for capture, utilization and sendout of latent heat in boil off gas ("BOG") onboard a cryogenic storage vessel is described. A liquefied gas vessel comprises a cryogenic cargo tank onboard a liquefied gas vessel, the cargo tank comprising a liquefied gas and a BOG, a latent heat exchanger fluidly coupled to a stream of the liquefied gas and a stream of the BOG, wherein the latent heat exchanger transfers a heat between the BOG stream and the liquefied gas stream to produce a condensed BOG, means for combining the condensed BOG and the liquefied gas stream to obtain a combined stream, the means for combining the condensed BOG and the liquefied gas stream fluidly coupled to the latent heat exchanger, and a liquefied gas regasifier onboard the vessel and fluidly coupled to the combined stream, wherein the liquefied gas regasifier regasifies the combined stream.

3 Claims, 8 Drawing Sheets

Related U.S. Application Data

(60) Provisional application No. 61/883,823, filed on Sep. 27, 2013.

(51) Int. Cl.
    *F17C 9/02* (2006.01)
    *B63B 25/16* (2006.01)
    *F17C 7/02* (2006.01)
    *F17C 13/00* (2006.01)
    *F17C 13/08* (2006.01)
    *B63J 99/00* (2009.01)

(52) U.S. Cl.
    CPC .......... *F17C 13/004* (2013.01); *F17C 13/082* (2013.01); *B63J 2099/003* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2223/043* (2013.01); *F17C 2223/047* (2013.01); *F17C 2225/0123* (2013.01); *F17C 2225/035* (2013.01); *F17C 2227/0135* (2013.01); *F17C 2227/0157* (2013.01); *F17C 2227/0178* (2013.01); *F17C 2227/0311* (2013.01); *F17C 2227/0318* (2013.01); *F17C 2227/0323* (2013.01); *F17C 2227/0339* (2013.01); *F17C 2227/0393* (2013.01); *F17C 2260/035* (2013.01); *F17C 2265/022* (2013.01); *F17C 2265/037* (2013.01); *F17C 2265/05* (2013.01); *F17C 2270/0105* (2013.01); *F17C 2270/0123* (2013.01); *F17C 2270/0136* (2013.01); *Y02T 70/5263* (2013.01)

(58) Field of Classification Search
    CPC .......... F17C 2265/034; F17C 2265/033; F17C 2265/056; F17C 2265/05; F17C 2270/0102; F17C 2270/0105; F17C 2270/011; F17C 2270/0113; F17C 2270/0115; F17C 2270/0118; F17C 2270/0121; F17C 2223/0161; F17C 9/02; F17C 9/04; F17C 2265/03; F17C 2265/031; F17C 2265/032; F17C 2227/0306; F17C 2227/0388; F17C 2227/0393; F17C 221/033
    See application file for complete search history.

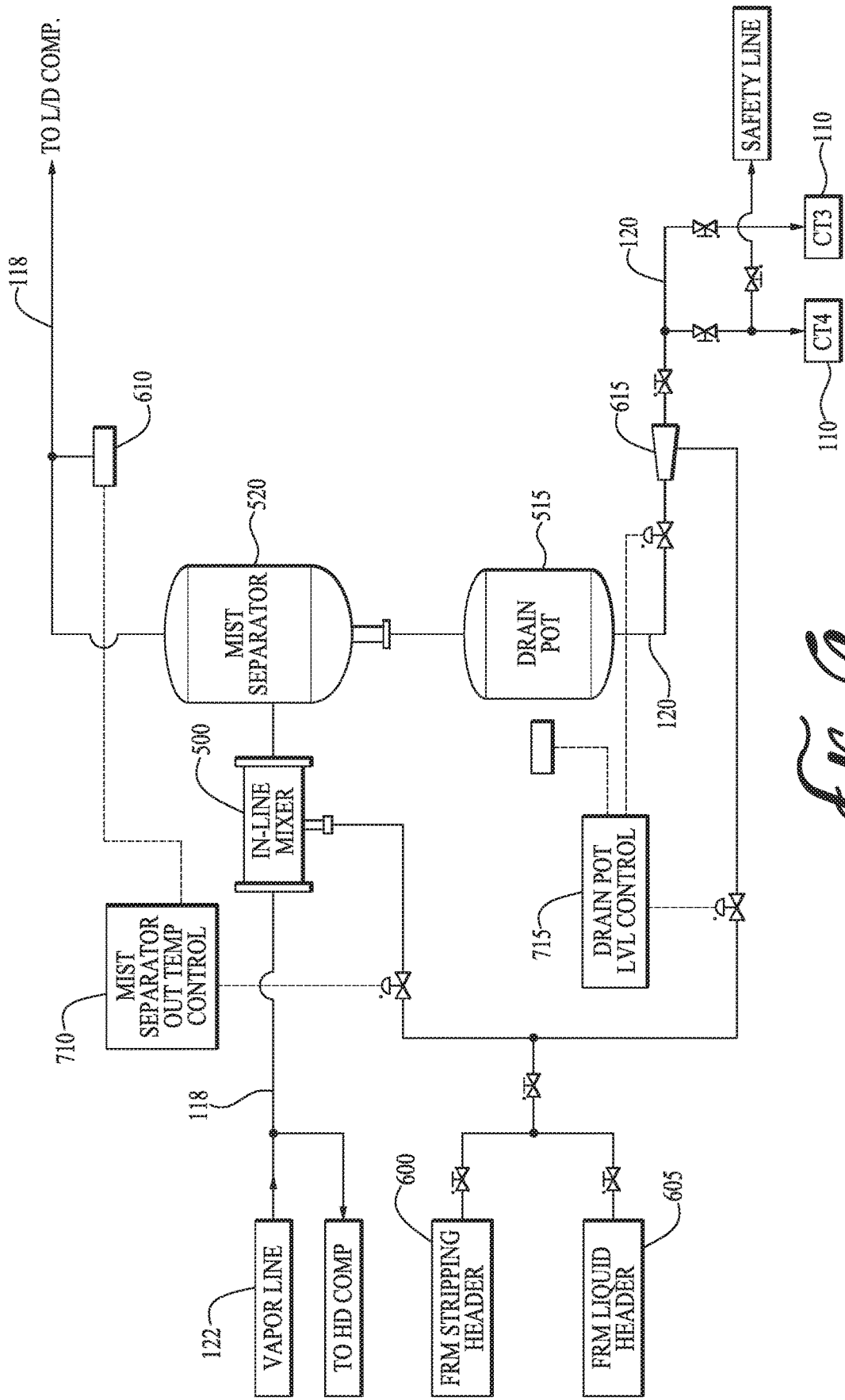

APPARATUS, SYSTEM AND METHOD FOR THE CAPTURE, UTILIZATION AND SENDOUT OF LATENT HEAT IN BOIL OFF GAS ONBOARD A CRYOGENIC STORAGE VESSEL

BACKGROUND

1. Field of the Invention

Embodiments of the invention described herein pertain to the field of marine transportation of liquefied cryogenic hydrocarbons. More particularly, but not by way of limitation, one or more embodiments of the invention enable an apparatus, system and method for the capture, utilization and sendout of latent heat in boil off gas onboard a cryogenic storage vessel.

2. Description of the Related Art

It is often advantageous to transport hydrocarbons that are normally in gaseous form at ambient conditions as sub-cooled liquids. For example, although many hydrocarbons are typically transported from the location produced to the location consumed as a gas by pipeline, there are circumstances where doing so may not be feasible. For example, the location of production and the location of demand may be separated in such a manner that ocean transport aboard a vessel over much of the distance to market is more economically feasible than transport via pipeline. Without an effective way to transport the gas to a location where there is a commercial demand, opportunities to monetize the gas may be lost. This may be true for many types of hydrocarbons, such as natural gas, ethane, pentane or ethylene, which are often transported across the ocean in a liquefied state by vessel.

Liquefaction of gaseous hydrocarbons facilitates storage and transportation of the hydrocarbon. For example, liquefied natural gas ("LNG"), largely consisting of methane mixed with other hydrocarbon components, takes up only about 1/600 of the volume that the same amount of natural gas does in its gaseous state. A liquefied hydrocarbon is produced by cooling the hydrocarbon below its boiling point (for natural gas, about −160° C. at atmospheric pressure, depending on cargo grade; for ethylene about −104° C., for ethane about −89° C.). The liquefied hydrocarbon may be transported and stored in cryogenic containers slightly above atmospheric pressure. Upon reaching the location of intended use, the liquefied hydrocarbon may be converted back to its gaseous form by adding heat and thereby raising the temperature above its boiling point.

Liquefied hydrocarbons are typically stored onboard cryogenic storage vessels, such as liquefied petroleum gas ("LPG") carriers, which are designed to carry mainly butane, propane, butadiene, propylene vinyl chloride monomer or anhydrous ammonia; LNG carriers, which are designed to carry LNG (mostly methane); ethylene carriers, which may also carry LPG; and ethane carriers, which may also carry LNG. In each case, the liquefied gas is stored onboard a vessel in insulated storage tanks to minimize ambient heat ingress and the accompanying rise in temperature and pressure it causes. Nonetheless, heat enters the cargo tanks due to the large temperature differential and is absorbed by the cargo, raising the cargo's temperature and pressure.

In order to control tank pressures, heat is removed from the cargo by allowing a portion of the cargo to boil off, which releases the latent heat of vaporization contained in the vapor generated from the liquid remaining. The resultant vapor, commonly referred to as "boil off" or "BOG" (Boil-Off Gas) is continually removed from the tanks in order to maintain a safe operating pressure and cargo temperature within the tanks.

BOG is commonly used as a fuel in a vessel's power plant to provide for the vessel's energy needs. For example, many vessels make use of a steam turbine as the main propulsion engine. In such instances, BOG may be burned in steam boilers to produce steam for the steam turbines. In other power plants, the BOG is consumed in dual fuel diesel engines driving electrical generators.

However, in many cases, the energy available in the BOG exceeds the vessel's requirements. In such instances, the excess BOG must be disposed of, and is wasted. Typically, excess steam generated by the ships boilers is dumped to the main condenser where it is condensed and the heat removed is transported overboard with the circulating water. Alternatively, ships may be outfitted with gas combustion units ("GCU") which burn the excess BOG.

To avoid wasting BOG, new-build vessels have been fitted with nitrogen expansion reliquefaction plants or suction drum-type recondensers, the latter of which incorporate a recondenser in the upper portion of a suction drum. However, reliquefaction plants and suction drum recondensers are capital intensive and utilize separate refrigeration systems for reliquefaction. Reliquefaction plants, in addition, require large amounts of electrical power, and current recondensers may require a minimum of 80 to 85 mmscf/d sendout to operate in order to recondense all BOG fed to them during operation. As a result, reliquefaction plants and recondensers may not be feasible or appropriate as retrofit solutions for existing vessels because they require significant additional equipment and downtime for installation.

It has also been proposed that BOG, which has been condensed, be returned to the liquefied gas cargo tank. However, with this approach, the condensed BOG is at a higher pressure and temperature than the ambient pressure and temperature in the cargo tank. When the BOG is reintroduced into the tank, the BOG goes from a saturated condition to a lower pressure condition outside the saturation range for the temperature of the cargo tank. As a result, the condensed BOG flashes off at let-down, effectively returning much of the condensed BOG back to vapor in the cargo and replacing BOG removed from the tank.

In some instances, cryogenic storage vessels are equipped with regasification facilities and special arrangements, including gas arms, which provide for the regasification of a liquefied hydrocarbon aboard the vessel and the discharge of the gas to a pipeline. This has certain advantages, in that the regasification facility travels with the vessel. This can make it easier to accommodate gas demand that is seasonal or otherwise varies from location to location. Because the regasification facility travels with the vessel, it is not necessary to provide a separate storage and regasification facility, either onshore or offshore, at each location at which liquefied gas may be delivered.

In regard to regasification vessels and onshore regasification facilities that receive liquefied gas from seagoing vessels, wasted BOG directly affects the overall efficiency of the regasification facility. The efficiency is typically measured as the amount of liquefied gas actually delivered as compared to the amount loaded onboard the vessel and is expressed as a percentage.

Conventional techniques for conserving BOG are not well suited as retrofit solutions for existing steam powered cryogenic storage vessels to improve their efficiency. In regard to newbuild vessels reliquefaction plants may not be cost effective. Therefore, there is a need for an apparatus, system and method for capturing, utilizing and sending out the latent heat contained in the BOG onboard a cryogenic storage vessel.

SUMMARY

One or more embodiments enable an apparatus, system and method for capturing, utilizing and sending out latent heat onboard a cryogenic storage vessel.

An apparatus, system and method for capturing, utilizing and sending out latent heat onboard a cryogenic storage vessel are described. An illustrative embodiment of a liquefied gas vessel comprises a cryogenic cargo tank onboard a liquefied gas vessel, the cargo tank comprising a liquefied gas and a boil off gas ("BOG"), a latent heat exchanger fluidly coupled to a stream of the liquefied gas and a stream of the BOG, wherein the latent heat exchanger transfers a heat between the BOG stream and the liquefied gas stream to produce a condensed BOG, means for combining the condensed BOG and the liquefied gas stream to obtain a combined stream, the means for combining the condensed BOG and the liquefied gas stream fluidly coupled to the latent heat exchanger, and a liquefied gas regasifier onboard the vessel and fluidly coupled to the combined stream, wherein the liquefied gas regasifier regasifies the combined stream. In some embodiments, the liquefied gas vessel further comprising a power system onboard the vessel that burns a second BOG stream as a fuel. In certain embodiments, the latent heat exchanger further comprises an uncondensed gas vent, wherein the uncondensed gas vent is fluidly coupled to the second BOG stream. In some embodiments the vessel further comprises a condensate drain pot fluidly coupled between the latent heat exchanger and the means for combining the condensed BOG and the liquefied gas stream, wherein the condensate drain pot further comprises a condensed BOG inlet fluidly coupled to an outlet of the latent heat exchanger, a liquefied gas inlet fluidly coupled to the cryogenic cargo tank, and a condensed BOG outlet fluidly coupled to the condensed BOG inlet. In some embodiments, the condensate drain pot further comprises a vent fluidly coupling a noncondensed BOG with fuel gas. In certain embodiments, the latent heat exchanger comprises a BOG inlet that receives compressed BOG from a discharge side of a compressor, wherein the compressor regulates a discharge pressure of the BOG stream entering the latent heat exchanger.

An illustrative embodiment of a method for the capture, utilization and sendout of latent heat in boil-off gas ("BOG") onboard a liquefied gas vessel comprises flowing a feed stream of liquefied gas from a cargo tank onboard a liquefied gas vessel to a regasifier, diverting a portion of the liquefied gas feed stream through a cold box as coolant, removing BOG from the cargo tank in a BOG fuel stream, the BOG fuel stream flowing from a compressor to a BOG heater for use as fuel for a power system of the liquefied gas vessel, creating a flow restriction on the BOG fuel stream to cause a portion of the BOG stream to flow through the cold box for recondensation, returning non-condensable gas from the cold box to the BOG fuel stream, and combining recondensed BOG from the cold box and the portion of the liquefied gas feed stream exiting the cold box with the feed stream of liquefied gas flowing to the regasifier. In some embodiments, the regasifier is located on one of a jetty at which the liquefied gas vessel is moored, onshore or on another vessel.

An illustrative embodiment of a system for capturing latent heat onboard a liquefied gas vessel comprises a liquefied gas vessel, a plurality of cargo tanks below a deck the liquefied gas vessel, the plurality of cargo tanks comprising a liquefied gas and a boil off gas ("BOG"), a feed stream of the liquefied gas extending from the plurality of cargo tanks to a regasifier, a latent heat exchanger on the deck of the liquefied gas vessel thermally coupling a stream of the BOG to a portion of the liquefied gas stream, wherein heat is transferred from the BOG stream to the portion of the liquefied gas stream in the latent heat exchanger such that the BOG stream is condensed, and a drain pump on the deck that combines the condensed BOG stream exiting the latent heat exchanger with the portion of the liquefied gas stream to produce a combined stream. In some embodiments, the system further comprises a drain pot fluidly coupled to a condensed BOG outlet of the latent heat exchanger, wherein the drain pot further comprises an uncondensed gas vent, and a portion of the BOG stream that does not condense in the latent heat exchanger is vented to a fuel stream. In certain embodiments, the latent heat exchanger further comprises an uncondensed gas vent, and a portion of the BOG stream that does not condense in the latent heat exchanger is burned in a boiler to power one of a steam turbine or a diesel engine. In certain embodiments, the liquefied gas is one of ethane, methane, ethylene or LNG. In some embodiments, the system further comprising a power system in a cargo machine room onboard the liquefied gas vessel, wherein the power system utilizes a second stream of the BOG as a fuel. In certain embodiments, the latent heat exchanger further comprises an uncondensed gas vent, and a portion of the BOG stream that does not condense in the latent heat exchanger is vented to the second stream of the BOG. In certain embodiments, the latent heat exchanger is a plate fin heat exchanger.

An illustrative embodiment of a method for regasifying a liquefied gas on a regasification vessel comprises removing a boil-off gas ("BOG") from a cargo tank onboard a regasification vessel, the cargo tank comprising a liquefied gas and the BOG, passing a stream of the BOG in heat exchange with a feed stream of the liquefied gas to condense the stream of the BOG, wherein heat is transferred from the BOG stream to the liquefied gas stream in a heat exchanger, a step for combining the condensed BOG with the feed stream after the feed stream exits the heat exchanger, and regasifying the combined feed stream onboard the regasification vessel for delivery as regasified gas. In some embodiments, the method further comprises utilizing a second stream of the BOG as fuel for a power unit of the regasification vessel. In certain embodiments, the method further comprises venting uncondensed gas from the heat exchanger to the second stream of the BOG and burning the vented uncondensed gas in a heater. In some embodiments, the method further comprises assuring a minimum level of liquefied gas is maintained in an accumulator drum, the accumulator drum fluidly coupled between a discharge side of the heat exchanger and a suction side of one of an eductor or a centrifugal pump. In some embodiments, the method further comprises venting uncondensed gas from the accumulator drum to the cargo tank.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments will be more apparent from the following more particular description thereof, presented in conjunction with the following drawings wherein:

FIG. 6 is a schematic diagram of an illustrative embodiment of a BOG cooling system fitted upstream of a BOG compressor in a latent heat capture, utilization and sendout system of an illustrative embodiment.

Figure 1:
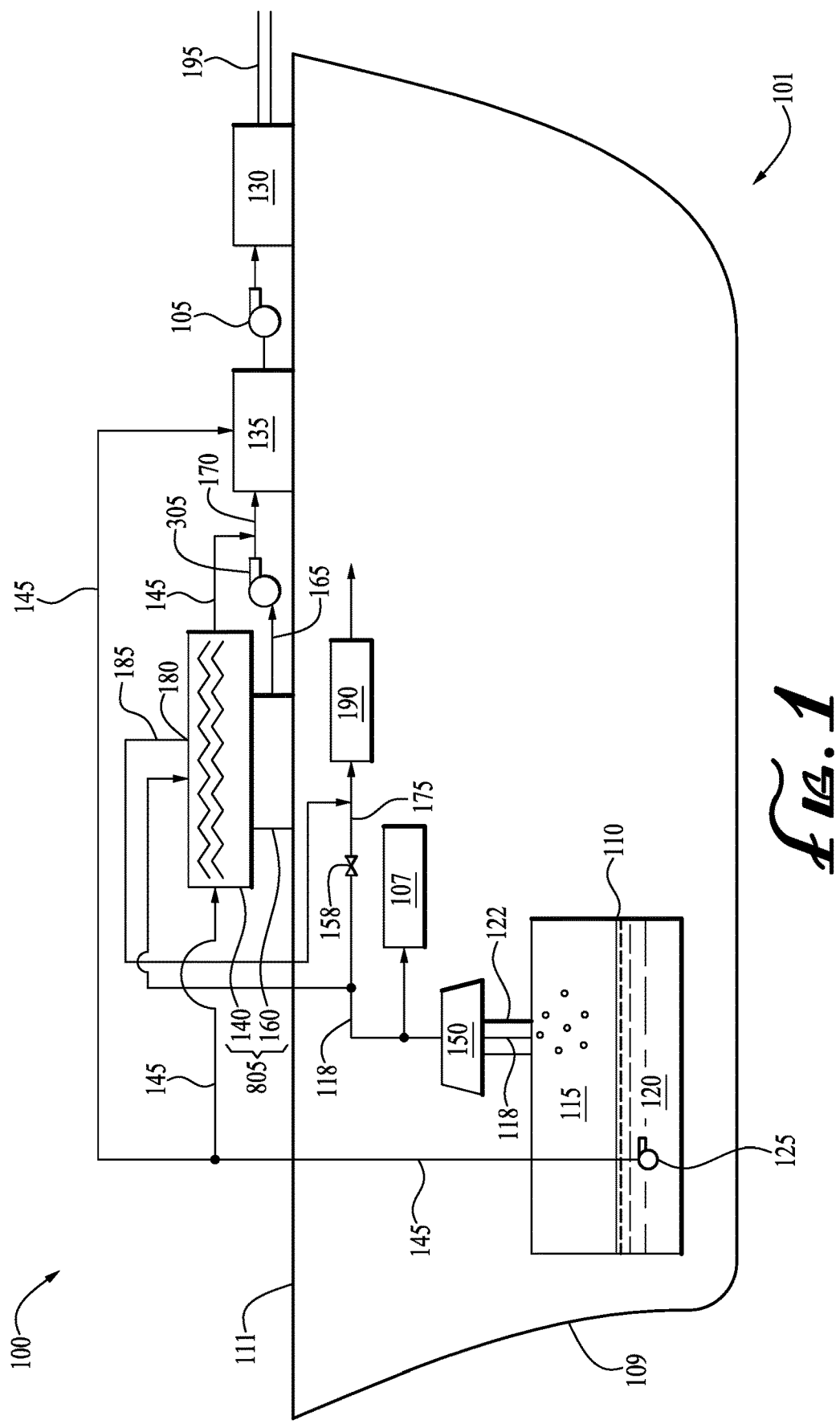
FIG. 1 illustrates a schematic diagram of an illustrative embodiment of a latent heat in BOG capture, utilization and sendout system onboard a cryogenic storage vessel.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

An apparatus, system and method for capture, utilization and sendout of latent heat onboard a cryogenic storage vessel will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a cargo tank includes one or more cargo tanks.

"Coupled" refers to either a direct connection or an indirect connection (e.g., at least one intervening connection) between one or more objects or components. The phrase "directly attached" means a direct connection between objects or components.

As used in this specification and the appended claims, "or" is used to mean "and/or" unless explicitly indicated to refer to alternatives only or the alternatives are mutually exclusive.

As used in this specification and the appended claims, "liquefied gas" means any substance in a gaseous state at ambient temperature and pressure, transported in liquefied form in a pressurized and/or refrigerated cargo tank.

As used in this specification and the appended claims, "liquefied gas vessel" means any floating carrier, platform, unit or vessel configured to store, transport and/or offload liquefied gas and/or regasified liquefied gas in a navigable body of water.

As used in this specification and the appended claims, "regasification vessel" means a liquefied gas vessel with regasification facilities onboard to vaporize the liquefied gas.

As used in this specification and the appended claims, "regasify", "regasification", "vaporization" and "vaporize" all interchangeably mean to return a liquefied gas to its gaseous state. "Regasifier" or "vaporizer" refers interchangeably to a heat exchanger which directly causes regasification of a liquefied gas.

"Recondense" or "recondensation" refers to returning a BOG back to a cryogenic liquid state.

As used in this specification and the appended claims, "latent heat exchanger" refers to one or more heat exchangers wherein the latent heat of vaporization is removed from a gas causing the gas to condense to a liquid. Sensible heat may also be removed in a latent heat exchanger, for example, if doing so assists in reaching the condensation temperature of the gas. A "cold box" refers to a latent heat exchanger in combination with an associated condensate drain pot.

One or more embodiments provide an apparatus, system and method for capture, utilization and sendout of latent heat in boil off gas ("BOG") onboard a cryogenic storage vessel. While for illustration purposes the invention is described in terms of liquefied hydrocarbons, nothing herein is intended to limit the invention to that embodiment. The invention may be equally applicable to other gases which may be transported as liquids, for example, ammonia or vinyl chloride.

Illustrative embodiments disclosed herein includes an apparatus, system and method for capture, utilization and sendout of latent heat in BOG onboard a cryogenic storage vessel. A latent heat exchanger may transfer heat between boil off gas produced from a liquefied gas in a cargo tank on the one hand, and a stream of the liquefied gas from the cargo tank on the other hand. The latent heat exchanger may cause the BOG to condense, and upon discharge from the latent heat exchanger, the condensed BOG may be combined with the stream of liquefied gas exiting the heat exchanger. The combined stream then continues to a regasification facility. The cargo tank and regasification facility may be onboard a liquefied gas vessel. In some embodiments, the cargo tank is onboard a liquefied gas vessel and the regasification facility is on a jetty at which the liquefied gas vessel is moored, onshore or on a second adjoining vessel. In some embodiments, the vessel may use steam as its main propulsion, the steam turbine of the propulsion unit burning a portion of the BOG from the cargo tank for fuel. In some embodiments, the vessel may use a portion of the BOG from the cargo tank to fuel a power plant onboard the vessel. Uncondensed BOG from the latent heat exchanger and/or a condensate drain pot may be vented to a BOG fuel stream or to a cargo tank.

The apparatus, system and method of illustrative embodiments improve the efficiency of liquefied gas regasification facilities by allowing more liquefied gas to be sent to regasification facilities, rather than being lost or wasted as excess BOG, as compared to conventional systems and methods. Illustrative embodiments may be particularly advantageous as a retrofit solution for steam powered regasification vessels, in order to improve their efficiency at a low cost and in a timely manner whilst still allowing some BOG to be utilized for fuel by the main power unit of the vessel. Conventional vessels typically waste excess BOG that is not utilized in the power system. A conventional vessel may typically waste from approximately one ton per hour to upwards of eight tons per hour of BOG, which makes those vessels inefficient with respect to the quantity of cargo they are capable of regasifying or sending to a regasifier, as compared to the quantity of cargo initially loaded onboard the vessel. In contrast, as detailed herein, illustrative embodiments may recondense between one to eight tons per hour over an approximate 50 to 150 mmscf/d sendout rate as applied to current vessels.

Illustrative embodiments are simple to implement and operate. Illustrative embodiments disclosed herein may maintain current equipment configurations onboard vessels and/or minimize new equipment and modifications to retrofit a vessel. Illustrative embodiments disclosed herein may not require a separate refrigeration system for reliquefaction. Illustrative embodiments disclosed herein may improve the efficiency and reduce the cost of newbuild vessels. Further, once BOG is recondensed, illustrative embodiments may avoid "let down" and reflashing of condensed BOG. Specifically, reflashing may be avoided since recondesed BOG is not reintroduced into a liquefied gas cargo tank onboard the vessel. Thus, the liquefied gas is not taken from a saturated condition to a lower pressure condition outside the saturation range for the temperature of the liquefied gas, as may occur if the condensed BOG is reintroduced into a cargo tank.

In some embodiments, the stream of liquefied gas transports the latent heat of vaporization off the vessel with the gas and/or liquid being delivered from the vessel. Capturing latent heat from the BOG in the liquefied gas stream further increases the efficiency of the liquefied gas vessel and/or regasification facility, since by adding heat captured from the condensation of BOG to the liquefied gas stream, less additional heat is later-needed to regasify the liquefied gas.

The Cryogenic Storage Vessel

FIG. 1 is a schematic of an illustrative embodiment of a latent heat in BOG capture, utilization and sendout system onboard a cryogenic storage vessel. All or a portion of latent heat capture system 100 may be located on liquefied gas vessel 101, for example an FSU, FSRU, LNG carrier, LPG carrier or regasification vessel. The liquefied gas vessel may be of any carrying capacity, for example 125,000 m$^3$, 138,000 m$^3$, 150,000 m$^3$, 173,400 m$^3$, 210,000 m$^3$ or 250,000 m$^3$. Cargo tank 110 may be a double hull cargo containment system of the spherical type, membrane type, cylindrical pressure type or of the structural prismatic design, each of which are well known to those of skill in the art, or any other cargo tank type suitable for storage and/or transportation of liquefied gas. Vessel 101 may include four or five cargo tanks 110, or any other number of cargo tanks as may be appropriate for vessel size and capacity.

Cargo tank 110 is located on vessel 101, for example in the vessel hull 109 and/or below deck 111, and includes liquefied gas 120 and BOG 115. Allowing liquefied gas 120 to boil to form BOG 115 may remove latent heat and maintain the remaining liquid in cargo tank 110 in a saturated state. Using tank pump 125, liquefied gas 120 is pumped from cargo tank 110 in liquefied gas stream 145. In some embodiments, liquefied gas stream 145 is a feed stream towards regasification facility 130. In certain embodiments, liquefied gas stream 145 may be any fluid stream used for cooling and transport of latent heat. In some embodiments, liquefied gas stream 145 and BOG stream 118 originate from the same cargo tank or group of cargo tanks.

Regasification Facilities

Regasification facility 130 may be onboard liquefied gas vessel 101. In other embodiments, regasification facility 130 may be onshore, on a jetty at which the liquefied gas vessel 101 is moored or onboard a second tandem or side-by-side vessel. Regasification facility 130 may include a regasfier that uses steam, air, water, and/or submerged combustion as a source of heat to regasify liquefied gas 120 prior to delivery to a pipeline, storage facility or distribution system. Regasification facility 130 may operate in open-loop, closed-loop and/or a combined mode and/or make use of a heat transfer fluid, or submerged combustion, to transfer heat from the heating source to the liquefied gas. In some embodiments, regasification system 130 may include an intermediate fluid, and the intermediate fluid may circulate in a loop between a heat exchanger and a regasifier, the heat exchanger transferring heat from a heat source such as steam, air and/or sea water to the intermediate fluid, and the regasifier transferring heat from the intermediate fluid to the liquefied gas stream 145, to raise the temperature of the liquefied gas 120 above its boiling point. In other embodiments, a heat source may provide heat energy directly to the regasifier. The regasifier may be a shell and tube vaporizer, a plate-fine vaporizer, or another vaporizer known to those of skill in the art.

Liquefied gas stream 145 may pass through suction drum 135 prior to entering regasification facility 130. Suction drum 135 may ensure that only liquid passes to regasification facility 130. In some embodiments, liquefied gas stream 145 may pass directly to the suction side of feed pump 105 without the need for suction drum 135. All or a portion of liquefied gas stream 145 on its way to regasification facility 130 may be diverted through latent heat exchanger 140 as coolant for latent heat exchanger 140 and/or cold box 805. Regas valve 112 (shown in FIG. 3) may regulate the flow of liquefied gas 120 to suction drum and/or regasification facility 130. In some embodiments, liquefied gas stream 145 may pass through feed pump 105 to increase the pressure of liquefied gas stream 145 prior to entering regasification facility 130.

Liquefied gas 120 that has been regasified may be transported from regasification facility 130 using gas conduit 195 to onshore storage facilities, a dock, a gas pipeline and/or gas distribution system. Conduit 195 may be a high pressure gas arm, manifold, pipeline or any other rigid or flexible means for transporting gaseous natural gas known by those of skill in the art. In some embodiments a portion of BOG 115 may be returned to shore or to a second vessel during transfer operations, as shore gas 107.

Boil-Off Gas Removal & Compression

BOG 115 may also be removed and/or pumped with a compressor from cargo tank 110. In some embodiments BOG 115 is removed and/or pumped from a vapor header 122 connected to cargo tank 110. Vapor header 122 may be a pipe, manifold and/or conduit through which BOG stream 118 flows from cargo tank 110 to the suction of BOG compressor 150 and/or booster compressor 153 (shown in FIG. 3). In some embodiments, vapor header 122 may provide a means of returning vapor to shore or another ship during loading.

Figure 3:
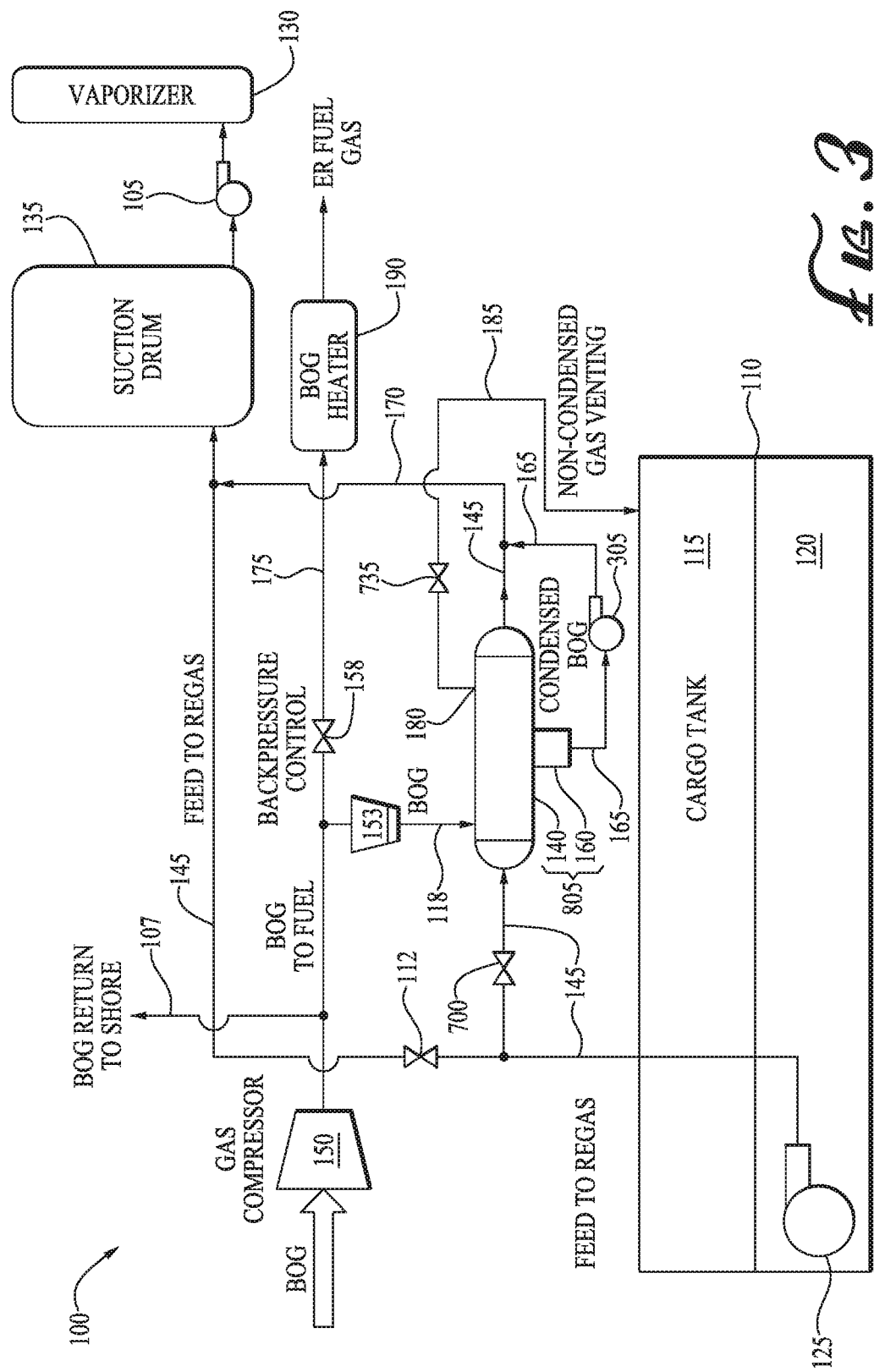
FIG. 3 is a schematic diagram of an illustrative embodiment of a latent heat in BOG capture, utilization and sendout system with non-condensed gas venting to a cargo tank.

After leaving cargo tank 110 and/or vapor header 122, BOG stream 118 may be sent through one or more BOG compressors 150. BOG compressor 150 increases the pressure of BOG stream 118. In some embodiments, BOG compressor 150 may boost the pressure of BOG stream 118 to between 2.0 and 2.8 bar absolute, depending upon the temperature of BOG stream 118 and/or liquefied gas stream 145. Flow of BOG stream 118 may be split through two or more compressors 150. For example, BOG fuel stream 175 may pass through a first BOG compressor 150, whilst the flow of BOG stream 118 to be recondensed may flow through a second compressor 150. Alternatively, as shown in FIG. 3, the flow of BOG stream 118 may be split after passage through BOG compressor 150, whereby only BOG stream 118 flowing to latent heat exchanger 140 passes through booster compressor 153 prior to entering latent heat exchanger 140. In embodiments employing booster compressor 153, booster compressor 153 may provide higher pressure compression than BOG compressor 150. Discharge pressure of BOG stream 118 exiting BOG compressor 150 may be regulated by backpressure control valve 158 in order to maintain saturation pressure in latent heat exchanger 140.

Boil-Off Gas Cooling System

BOG stream 118 may be cooled prior to entry into compressor 150 and/or booster compressor 153. In embodiments where the liquefied gas is LNG, for example, cooling BOG stream 118 to −130° C. or lower prior to entry into compressor may provide an optimal suction temperature for compressor 150, which may result in a higher mass flow to the cold box 805. FIG. 6 is an illustrative embodiment of a cooling system for a BOG compressor such as BOG compressor 150 and/or booster compressor 153. To cool the BOG stream 118, liquefied gas 120 from a cargo tank 110, stripping header 600 or liquid header 605 may be provided to a temperature regulating control 710 and in-line mixer 500. In-line mixer 500 may improve the capabilities of BOG compressor 150 and assure that BOG stream 118 entering BOG compressor 150 is sufficiently cold. In some LNG embodiments, in-line mixer 500 may bring the temperature of BOG stream 118 to about −130° C., or between about −110° C. and −140° C. Illustrative LNG embodiments may operate with BOG stream 118 temperatures warmer that about −110° C., such as −40° C., although such warmer temperatures may negatively impact the efficiency of the system. BOG stream 118 may be cooled to an operator set point, and the temperature may be controlled by temperature sensors/transmitters 610 and temperature controls 710. Mist separator 520 and mist separator drain pot 515 may be employed in combination with a level controller 715 and valves to control liquid levels. Liquefied gas entrained in the BOG exiting the in-line mixer 500 is removed by the mist separator 520 and flows to a mist separator drain pot 515 and cargo tank 100. Valves may be remotely operated using methods well known to those of skill in the art.

Cold Box

Figure 4:
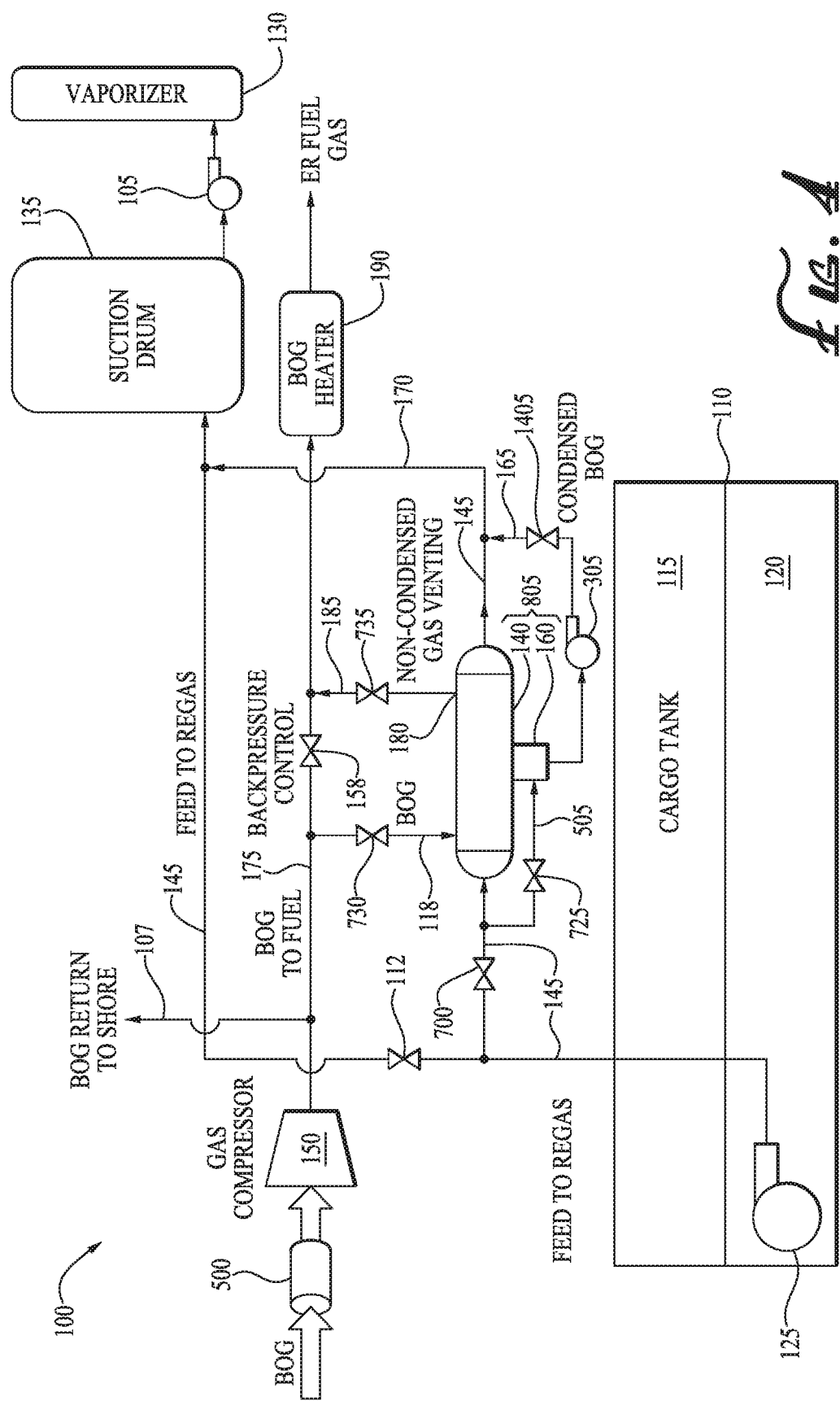
FIG. 4 is a schematic diagram of an illustrative embodiment of a latent heat in BOG capture, utilization and sendout system with non-condensed gas venting to fuel.
Figure 5:
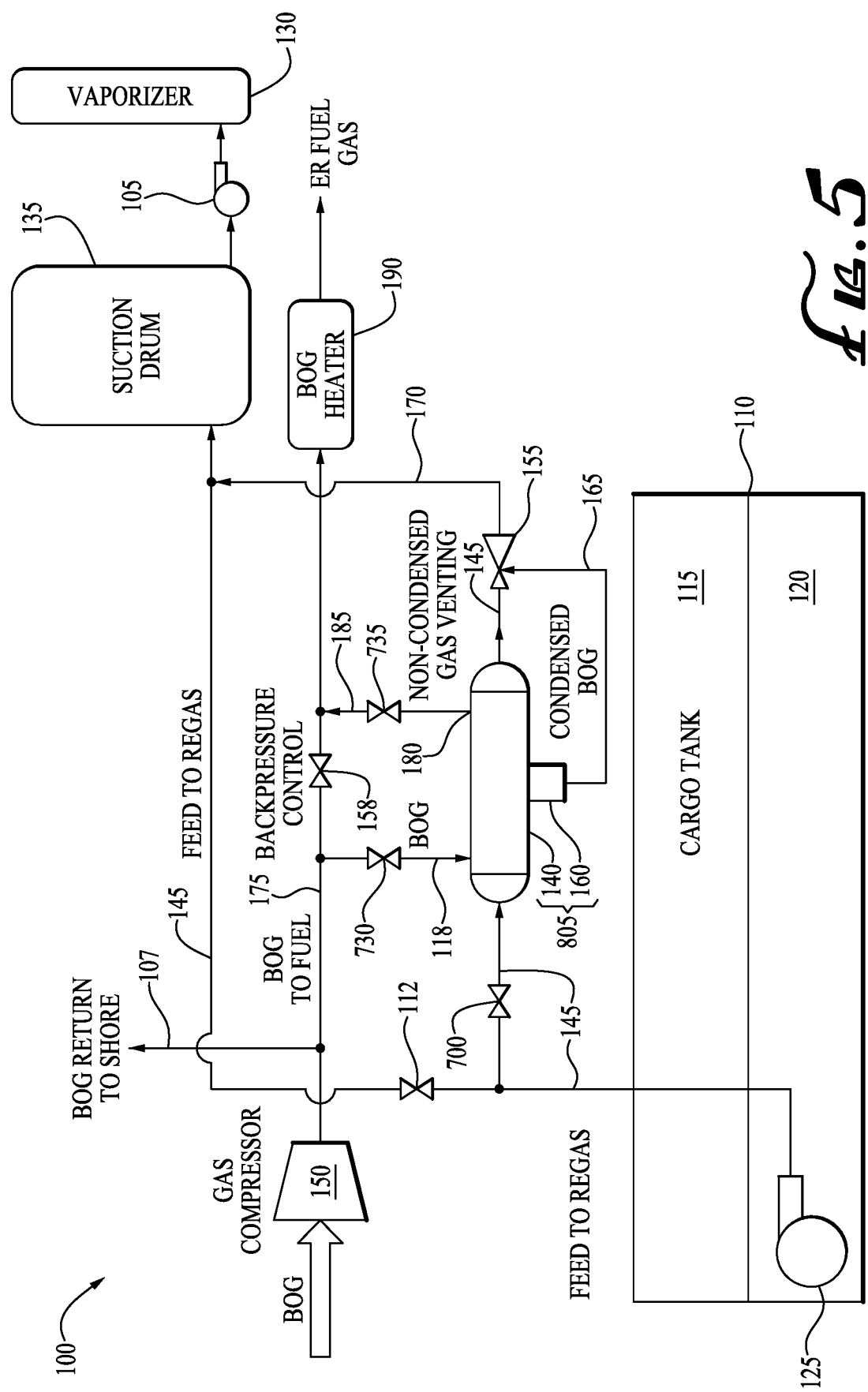
FIG. 5 is a schematic diagram of an illustrative embodiment of a latent heat in BOG capture, utilization and sendout system with non-condensed gas venting to fuel.
Figure 8:
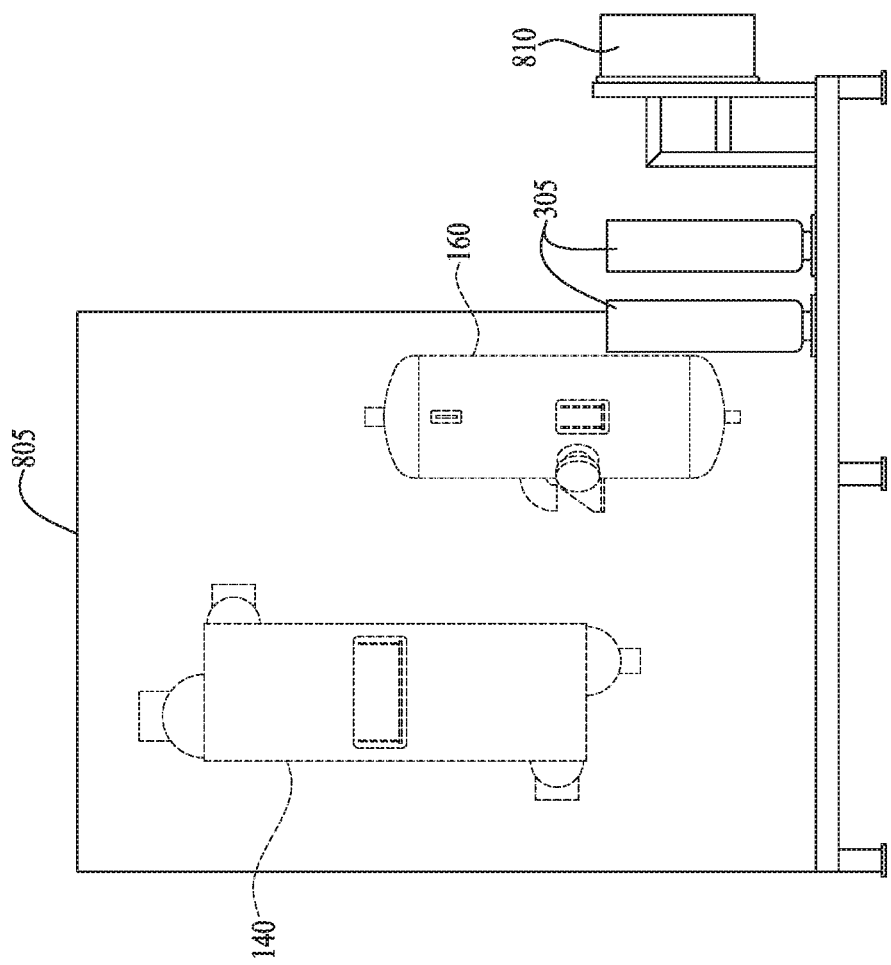
FIG. 8 is an elevation view of a cold box of an illustrative embodiment.

As illustrated in FIGS. 3-5, upon discharge from BOG compressor 150 and/or booster compressor 153, all or a portion of BOG stream 118 enters cold box 805, which may comprise latent heat exchanger 140 and cold box drain pot 160. FIG. 8 illustrates an exemplary cold box 805. As shown in FIG. 8, cold box 805 may include latent heat exchanger 140 and cold box drain pot 160 inside cold box 805. Drain pumps 305 and control box 810, which may be a control and instrument box for latent heat exchanger system 100, may be coupled to cold box 805. Piping has been omitted from FIG. 8 for clarity so as not to obscure the invention.

Returning to FIGS. 3-5, a backpressure control valve 158 in the flow path of BOG fuel stream 175 may allow BOG stream 118 to flow to latent heat exchanger 140 for condensation. BOG stream 118 to latent heat exchanger 140 may be controlled by a differential pressure controller and pressure control valve, heat exchanger valve 730. In latent heat exchanger 140, heat is removed from BOG stream 118 and transferred to liquefied gas stream 145, thereby condensing BOG stream 118 entering latent heat exchanger 140. Sufficient heat is removed from BOG stream 118 such that BOG stream 118 condenses, but liquefied gas 120 of liquefied gas stream 145 remains in a liquid state. After exiting latent heat exchanger 140, liquefied gas stream 145 carries additional heat that has been removed from BOG stream 118, and may continue to carry the heat on its way off the liquefied gas vessel 101. Latent heat exchanger 140 is configured such that BOG stream 118 is sufficiently cooled and the pressure of the BOG stream 118 sufficiently high to create saturated conditions for BOG stream 118, which causes BOG 115 contained in BOG stream 118 to condense, removing the latent heat of vaporization from BOG stream 118 and capturing such heat within liquefied gas stream 145. The additional heat contained in combined stream 170, which combined stream 170 may consist of condensed BOG 165 and liquefied gas stream 145 exiting latent heat exchanger 140 combined, may reduce the heat necessary for subsequent regasification, which adds efficiency to the regasification process. The latent heat removed from the BOG stream 118 may be utilized rather than wasted (for example, BOG 115 may not be wasted as steam caused by excess gas firing in the vessel 101 boilers, or burned in a GCU), and is also transported off of the ship with the vaporized gas and/or liquefied gas to be vaporized. Further constant cargo tank pressure 110 may be maintained.

Latent heat exchanger 140 may be one or more of a plate-fin exchanger, a shell-and-tube heat exchanger or other heat exchanger known to those of skill in the art. Latent heat exchanger 140 may transfer heat directly between stream 145 and BOG stream 118. In one LNG example, BOG stream 118 may be about −84° C. at the BOG compressor 150 outlet and −80° C. when fed to the inlet of latent heat exchanger 140, resulting in an outlet temperature of −156.3° C. at a maximum flow rate of 10.000 kg/h of BOG stream 118. In this example, liquefied gas stream 145 may be at about −159° C. entering heat exchanger 140 and about −149.5° C. exiting heat exchanger 140 at a maximum flow rate of 159.330 kg/h. Temperatures and flow rates may vary based upon the type of liquefied gas transported.

Flow of liquefied gas stream 145 may be controlled by cold-side valves 700 regulated by flow controllers with operator set points. The inlet and/or outlet of the cold side of latent heat exchanger 140 and/or cold box drain pot 160 exit may include pressure and temperature transmitters. Cargo tank 110 may also include pressure controllers.

Figure 7:
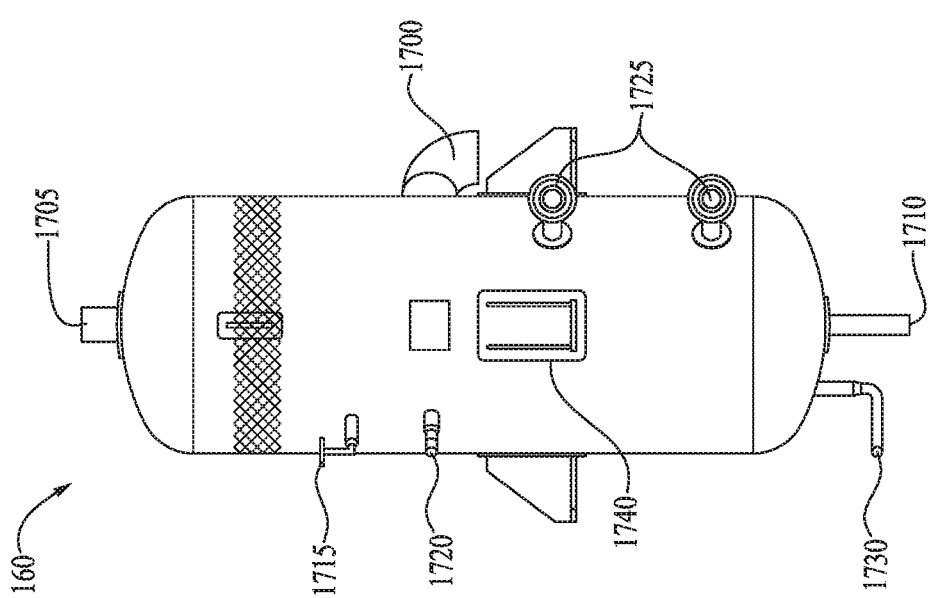
FIG. 7 is an elevation view of a condensate drain pot of an illustrative embodiment.

Cold box drain pot 160 may be a condensate drain pot and receive condensed BOG 165 from latent heat exchanger 140. FIG. 7 illustrates an exemplary embodiment of cold box drain pot 160. Cold box drain pot 160 may include a condensed BOG inlet 1700 for condensed BOG 165 from heat exchanger 140 and also a liquid inlet 1730 for liquefied gas 120 from level control line 505 (shown in FIG. 4). Suction at the condensed BOG outlet 1710 of drain pot 160 may be provided to drain pump 305 with control valves for level control or constant flow control. Pressure in cold box drain pot 160 may be regulated by a noncondensible return valve 735 downstream of nozzle 1705 on noncondensible return 185 to the compressor room (not shown) to maintain saturation conditions. Cold box drain pot 160 may also include level transmitters at level transmitter locations 1725, inspection hole 1740, safety 1715 and cold box drain pot vents 1720. Cold box drain pot 160 may be an accumulator drum and/or integral with latent heat exchanger 140. Alternatively, cold box drain pot 160 may be attached or coupled to latent heat exchanger 140. Maintaining a level of condensed BOG 165 in drain pot 160 may help ensure that essentially only liquid is introduced to the suction of eductor 155 and/or drain pump 305.

Stream Combination

Figure 9:
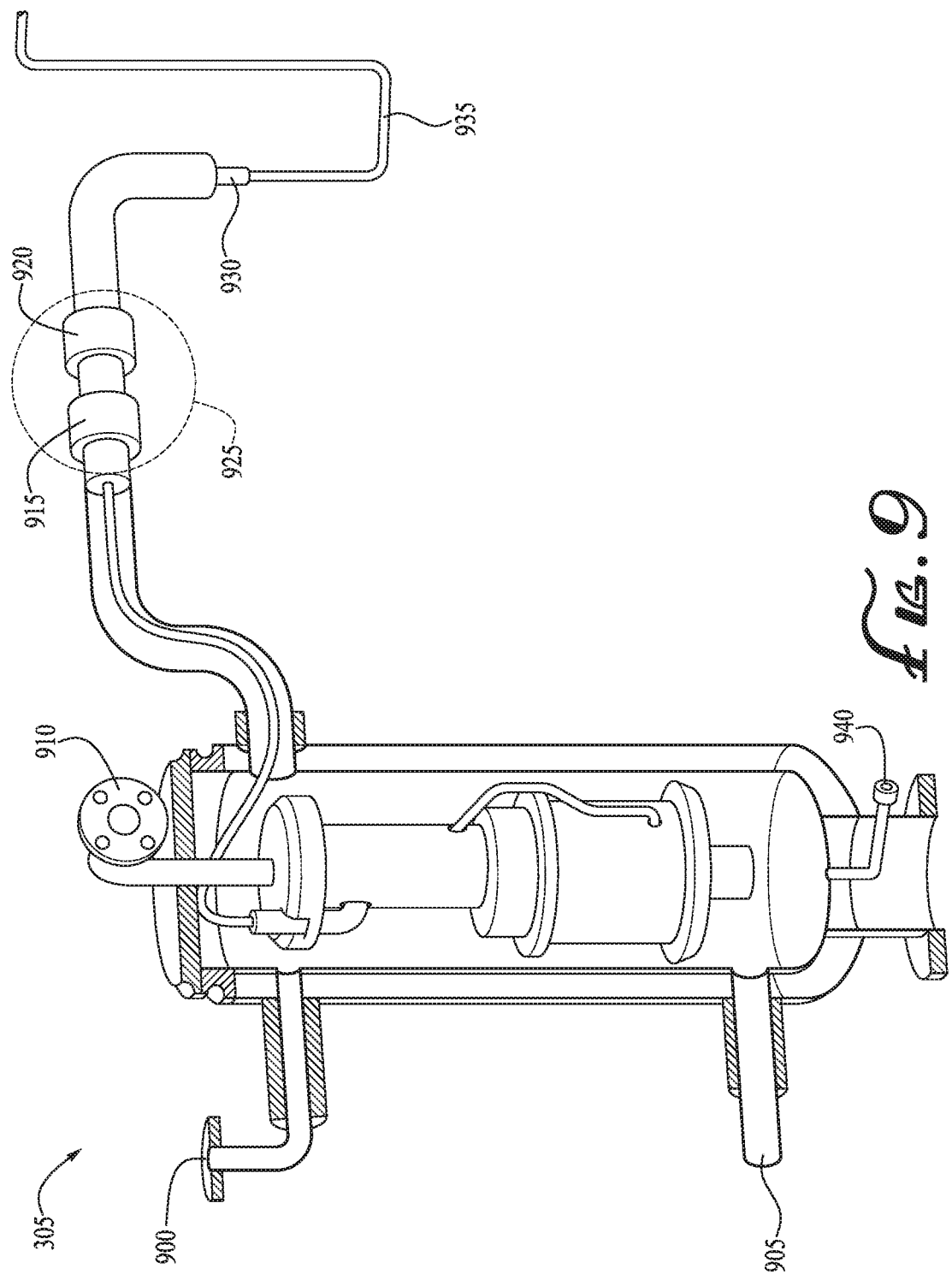
FIG. 9 is a cross-sectional elevation view of a drain pump of an illustrative embodiment.

Condensed BOG 165 may continue from latent heat exchanger 140 and/or cold box drain pot 160 to a mixer such as eductor 155 to be combined with liquefied gas stream 145. In some embodiments, eductor 155 is not necessary, and instead the liquefied gas stream 145 and condensed BOG 165 may blend together after passing through drain pump 305. FIG. 1 and FIGS. 3-4 illustrate embodiments employing drain pump 305 as the only means for combining liquefied gas stream 145 and condensed BOG 165. FIG. 5 illustrates an embodiment employing eductor 155 as a means for combining condensed BOG 165 and liquefied gas stream 145. Drain pump 305 may be one or more multi-stage centrifugal pumps, one or more single stage centrifugal pumps or any other type of pump designed for cryogenic service capable of creating sufficient head at required flow rates—for example a minimum continuous flow of 5.4 m$^3$/hr, rated flow of 18.1 m$^3$/hr and a maximum continuous flow of 21.7 m$^3$/hr. FIG. 9 is an illustrative embodiment of drain pump 305. As shown in FIG. 9, drain pump 305 may include discharge 910, drain pump vent 900, suction 905 and drain pump drain 940. Electrical feed through 925 with mating flanges may include a nitrogen pressure connection 915 and weldneck end 920. A cable gland 930 may connect to a pump power cable 935. In one exemplary embodiment drain pump 305 may be a 3-stage centrifugal pump and include a rated head of 123, a speed of 3700, an impeller diameter of 145, a rated flow of 300 and a kilowatt rating of 10 kW. Table 1 illustrates exemplary flow rates and head for drain pump 305.

TABLE 1

Flow Rates and Head for an Exemplary Drain Pump of an Illustrative Embodiment

| Flow Range m$^3$/hr | Head m | Pressure psi | Projected Efficiency % | Power kW | Expected Net Positive Suction Head Required m |
|---|---|---|---|---|---|
| 0.0 | 164 | 99 | 0.1 | 0.00 | 0.96 |
| 5.4 | 145 | 87 | 38.0 | 2.39 | 0.81 |
| 9.1 | 145 | 87 | 44.0 | 3.44 | 0.57 |
| 14.5 | 141 | 85 | 46.0 | 5.12 | 0.55 |
| 18.1 | 126 | 77 | 48.0 | 5.60 | 0.55 |
| 21.7 | 112 | 67 | 46.0 | 6.10 | 0.57 |

Eductor 155 and/or drain pump 305 may draw condensed BOG 165 into liquefied gas stream 145 exiting latent heat exchanger 140. In eductor embodiments, eductor 155 may include a stream inlet nozzle and a converging-diverging outlet nozzle. Liquid stream 145 may be converted into a high-velocity jet at the throat of the converging-diverging nozzle, which creates low pressure at the throat. The low pressure draws the condensed BOG 165 into the nozzle where it mixes with stream 145. Combined stream 170, comprising condensed BOG 165 and stream 145, may continue to suction drum 135 and/or be combined with a liquefied gas stream 145 proceeding directly to suction drum 135 (i.e., that portion of liquefied gas stream 145 bypassing cold box 805). Eductor 155 and/or drain pump 305 may be powered by and located in that portion of stream 145 that does not enter heat exchanger 140, or may be powered by and located in that portion of stream 145 that does enter heat exchanger 140, for example as shown in FIG. 4. In some embodiments, eductor 155 is not necessary and condensed BOG 165 and stream 145 may be combined downstream of drain pump 305, as shown in FIGS. 3 and 4. In such embodiments, condensed BOG 165 enters drain pump 305 and is combined with stream 145 upon exiting drain pump 305.

Whether combined with eductor 155 or combined downstream of drain pump 305, combined stream 170 may then continue to suction drum 135 and/or regasification facility 130. In some embodiments, combined stream 170 continues from eductor 155 and/or drain pump 305 directly to the suction side of feed pump 105, and suction drum 135 is not necessary. After exiting suction drum 135 and/or feed pump 105, combined feed steam 170 may continue to regasification facility 130, which may be onboard vessel 101 or as detailed elsewhere herein.

In some embodiments, at least a portion of stream 145 may pass from cargo tank 110 to regasification facility 130 without passing through latent heat exchanger 140. In such embodiments, this portion of stream 145 may be combined with combined stream 170 prior to entering regasification facility 130 and/or prior to entering suction drum 135.

Non-Condensed Gas Venting

BOG 115 may be comprised of a mixture of gases which have different boiling points. For example, BOG 115 may be comprised of mainly methane and nitrogen gases, which have different boiling points from one another. Methane boils at approximately −160° C., whilst N$_2$ boils at about −196° C. As a result, in such an example, while the methane may condense in latent heat exchanger 140, a significant portion of the nitrogen gas may not condense. In this example, accumulation of the nitrogen, or any other gas with a significantly lower boiling point than other constituents of liquefied gas 120, may block proper functioning of latent heat exchanger 140 and/or heat capture system 100. To combat such "uncondensable gas blocking" or "noncondensable gas blocking", latent heat exchanger 140 may vent non-condensed gas, for example as shown in FIGS. 3-5. Latent heat exchanger 140 and/or cold box drain pot 160 may include noncondensed gas vent 180, which in one example may be located on the side of latent heat exchanger 140 opposite the BOG inlet to latent heat exchanger 140. Noncondensed gas vent 180 allows uncondensed gases in latent heat exchanger 140 to leave latent heat exchanger 140 as vented gas 185. In some embodiments, vented gas 185 may be combined with BOG fuel stream 175 as shown in FIG. 4 and FIG. 5. In such instances, the composition of gas provided to BOG heater 190 may be monitored to avoid flame failure in the boilers. As shown in FIG. 3, in some embodiments, vented gas 185 may be returned to cargo tank 110 or another cargo tank onboard liquefied gas vessel 101. In some embodiments, vented gas 185 may vent to a vapor header 122. In some embodiments, some condensable (but uncondensed) BOG 115 may enter cold box drain pot 160.

Boil-Off Gas as Fuel

In some embodiments, all or essentially all BOG 115 may be either recondensed, used as fuel gas and/or, in some embodiments, returned to cargo tank 110 as vented gas 185. Latent heat capture system 100 may be located on a liquefied gas vessel 101 utilizing a steam powered plant, for example including a steam turbine generator, which boilers may also utilize BOG 115 as well as other fuels. In other embodiments, a dual fuel engine generator may be utilized for power, which dual fuel engine may also utilize BOG 115 as well as other fuels. In such embodiments, a portion of BOG 115 may be transferred from cargo tank 110 and/or BOG compressor 150 as fuel stream 175 to a steam boiler through BOG heater 190 to be used as fuel for power on the vessel. In some embodiments vented gas 185 may be vented and included in BOG fuel stream 175.

Latent Heat Capture, Utilization and Sendout Process

Figure 2:
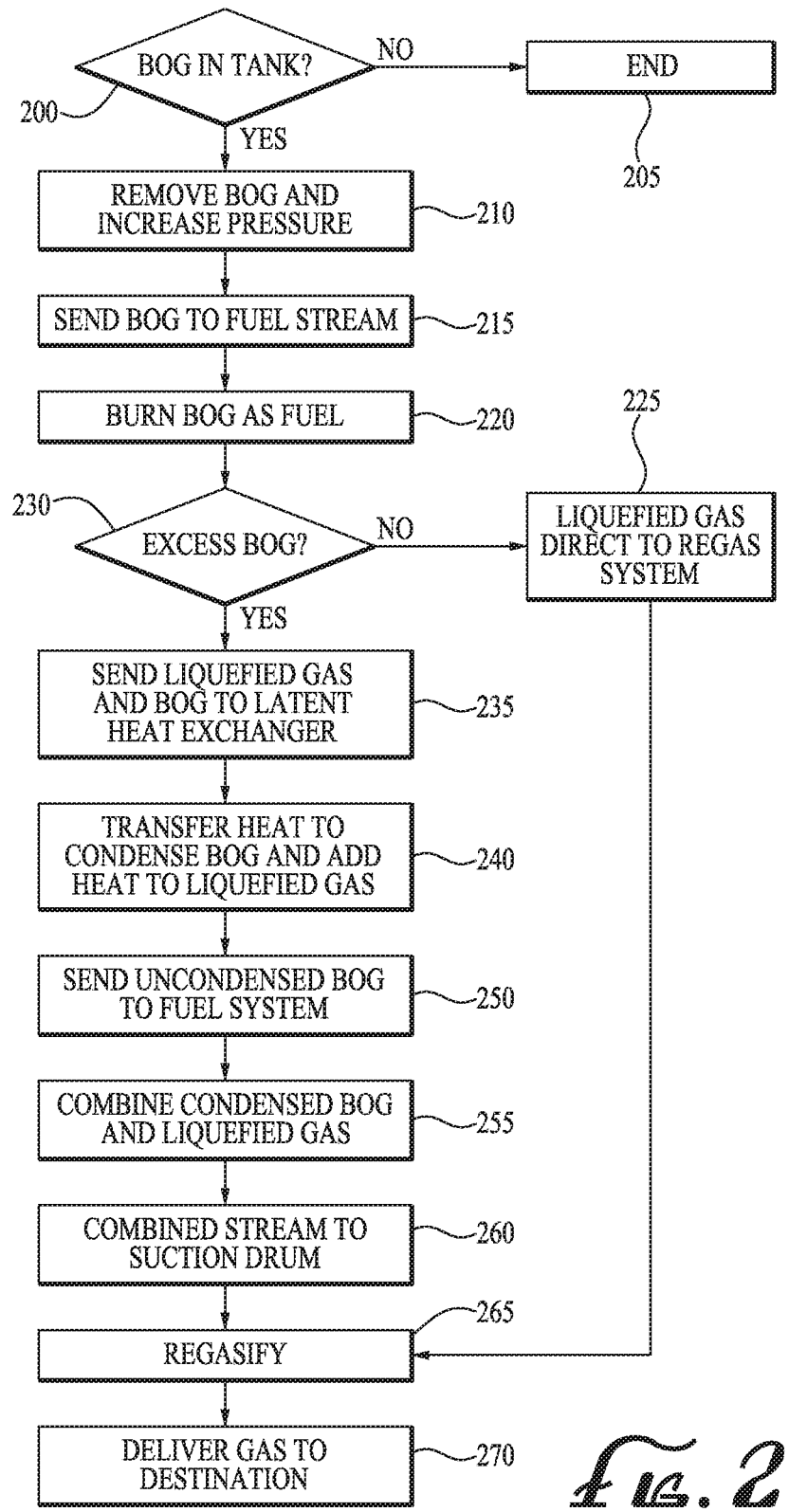
FIG. 2 is a flow chart illustrating an exemplary method of capture, utilization and sendout of latent heat in boil off gas ("BOG") onboard a liquefied gas vessel.

FIG. 2 is a flow chart illustrating an exemplary method for capture, utilization and sendout of latent heat in BOG onboard a cryogenic storage vessel. If BOG is not present in cargo tanks 110, then the tanks may be empty and no further action may be needed at step 205. On the other hand, if BOG is in cargo tanks 110 at step 200, then at step 210, BOG 115 is removed from cargo tank 110 and/or a vapor header 122 and the pressure of the resulting BOG stream 118 may be increased in BOG compressor 150 and/or booster compressor 153. BOG stream 118 may also be cooled with in-line mixer 500 at step 210. If a portion of BOG 115 is needed for fuel, then at step 215, BOG 115 may be sent to fuel in BOG fuel stream 175, and BOG fuel stream 175 may be burned for fuel at step 220. In some embodiments, at step 215, BOG 115 may be passed as fuel stream 175 to BOG heater 190 that raises the temperature of the fuel gas before it is burned. Such BOG 115 may be burned as fuel at step 220. Alternatively, in some embodiments at step 220 a BOG compressor 150 may increase the pressure of BOG fuel stream 175 for use as fuel in the vessel's power plant. In embodiments where BOG 115 may be burned as fuel, only a portion of BOG 115 may be needed for that purposes. If there is excess BOG (more BOG than needed for fuel) at step 230, the excess BOG may be diverted for recondensation at step 235, for example by being sent to latent heat exchanger 140. In some embodiments, a portion of BOG 115 may be used for fuel while simultaneously a portion of BOG 115 is condensed in latent heat exchanger 140.

If liquefied gas 120 is not needed for cooling BOG 115 in latent heat exchanger 140 at step 230 and/or 235, then at step 225 liquefied gas 120 may be sent directly from cargo tank 110 to regasification facility 130 and/or suction drum 135, and regasified at step 265. If liquefied gas 120 is needed for cooling BOG stream 118 at step 230, then liquefied gas 120 is removed from cargo tank 110 by feed pump 125 and the pressure of the resulting liquefied gas stream 145 increased by feed pump 125. Liquefied gas 120 is then sent to latent heat exchanger 140 in stream 145 at step 235. At step 240, heat is transferred from BOG 115 to liquefied gas 120 in latent heat exchanger 140. If BOG 115 is condensed at step 240, then condensed BOG 165 and liquefied gas 120 exiting latent heat exchanger 140 (as liquefied gas stream 145) are combined into combined stream 170 with drain pump 305 and/or eductor 155 at step 255. If on the other hand a portion of the gas is not condensed in latent heat exchanger 140, then the uncondensed gas 185 is sent to fuel stream 175 at step 250 and burned as fuel and/or the uncondensed gas may be returned to cargo tank 110 or a vapor header 122. In embodiments where uncondensed gas 185 may be returned to a vapor header 122, uncondensed gas 185 to vapor header 122 may be limited to avoid a build-up of uncondensed gas 185 and a resulting loss of efficiency in the heat exchangers. Suction drum 135 collects combined stream 170 at step 260. Combined stream 170 leaves the suction drum 135 and is regasified at step 265 in regasification facility 130. Gas may then be delivered to its destination at step 270, for example, to a gas pipeline distribution system, to onshore treatment facilities, to another vessel, barge or platform, to a power plant or to any other suitable destination. In some embodiments, liquefied gas 120 may not be regasified prior to delivery, and instead delivered in liquefied form.

Process Controls

In some embodiments, substantially all BOG 115 that is not utilized for fuel (if any) may be reliquefied and combined into combined stream 170 as a liquid. Control over the flow of BOG 115 and liquefied gas 120 may be automated or controlled manually. Level control within cold box drain pot 160 may be achieved by flowing a portion of liquefied gas stream 145 directly to drain pot 160 through line 505 (shown in FIG. 4) as necessary. Control of fuel gas requirements for the power plant of vessel 101 with respect to the amount of BOG 115 to be recondensed may be achieved by means, such as remote monitoring and controls.

Arrangements of valves should be appropriate for preferred means of control and may be remote controlled. In one LNG example, regas valve 112 and/or cold side valve 700 may cause liquefied gas stream 145 to flow through regasification system 130 at up to 400 m³/hour in order to send as much liquid gas 120 as possible through latent heat exchanger 140 to achieve a maximum amount of coolant flowing through latent heat exchanger 140. Compressor valve 710 may control the BOG stream 118 inlet temperature to compressor 150 to −130 degree ° C. or lower to assure optimal suction temperature to compressor 150 as well as increase mass flow through compressor 150 and latent heat capture system 100 skid with a lower temperature. Drain pot level control 715 may provide the motive liquefied gas 120 to the mist separator drain pot 515 outlet eductor 615 for returning separated liquefied gas 120 to cargo tank 110. Drain pot level control 715 may be either open or closed depending upon high level and low level signals originating with the drain pot level controller. Throttling valves 1405 may be on the discharges of drain pump 305. They may be manually set to a fixed position or set to automatically maintain a constant flow based upon an operator entered set point on the pump amperage/flow curve. Level control valve 725 may provide drain pot 160 level control by the direct introduction of liquefied gas 120 into drain pot 160. Drain pump 305 flow should be set in excess of the amount of BOG stream 118 being condensed in the latent heat exchanger 140 such that this level control functions only as a make-up control. Doing so, may avoid recirculation of a cryogenic liquefied gas 120 that is relatively close to saturation.

Mist separator drain valve (not shown) may be below the mist separator 520 drain pot, and may always be open. Drain pot drain valve 715 may open and close at the same time as the valve supplying the outlet eductor 615. Backpressure control valve 158 may create a flow restriction in the BOG stream 175 from compressor 150 to BOG heater 190 in order to cause flow of excess BOG 115 to the latent heat exchanger 140 for recondensation. Backpressure control valve 158 may create a differential pressure across itself and operate in accordance with a differential pressure transmitter signal. The position of the valve may be manually set, or be set to automatically maintain a fixed differential in accordance with a set point provided by the operator. A facility may be provided to allow a default setting. Heat exchanger valve 730 may regulate the flow of BOG stream 118 into the latent heat exchanger 140 on the latent heat capture system 100 skid. Heat exchanger valve 730 may be manually positioned and set to maintain a constant flow based upon an operator entered set point. It may also be set in cascade to respond to compressor load changes based upon maintaining a constant tank pressure. The cascade may cause recondensation instead of excess gas firing in the boilers followed by steam dumping. Non-condensable gas return control valve 735 may be to the downstream side of backpressure control valve 158. Non-condensable gas return control valve 735 may have its position manually set or may be set to automatically maintain a constant pressure within the latent heat exchanger 140 to facilitate maintenance of saturated pressure conditions.

Piping carrying the streams and connecting the elements of the system is well known to those of skill in the art and thus is not described in detail herein so as not to obscure the invention. Piping may connect components of the apparatus and system located in various areas of vessel 101 and transport liquid and gas off of vessel 101. For example as shown in FIG. 1, compressor 150 and heater 190 may be located in a cargo machine room on board vessel 101, heat exchanger 140, drain pump 305 and regasification facility 130 may be on deck 111 of vessel 101, and cargo tank 110 may be located in the hull 109 of vessel 101.

Illustrative embodiments may allow liquefied gas vessels to increase their efficiency by delivering a greater percentage of their cargo at the delivery destination. Illustrative embodiments allow heat from excess BOG to be captured and utilized and carried off vessel 101 by the liquefied gas stream, rather than being wasted. Cargo that might otherwise be burned and disposed of as excess BOG may instead be conserved. Illustrative embodiments may reliquefy BOG despite the presence of constituents with varying boiling points present in the liquefied gas. Illustrative embodiments may improve upon conventional methods by avoiding flashing off at let-down of the condensed BOG. Illustrative embodiments may improve the efficiency of regasification facilities by capturing additional heat in the liquefied gas feed stream prior to the liquefied gas's entry in the regasification facility, and thus resulting in less heat energy needed for regasification. Illustrative embodiments may not require a separate refrigeration system for reliquefaction.

Further modifications and alternative embodiments of various aspects of illustrative embodiments may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. In addition, it is to be understood that features described herein independently may, in certain embodiments, be combined.

The invention claimed is:

1. A method for the capture, utilization and sendout of latent heat in boil-off gas (BOG) onboard a liquefied gas vessel comprising:
    flowing a feed stream of liquefied gas from a cargo tank onboard a liquefied gas vessel to a regasifier;
    diverting a portion of the liquefied gas feed stream through a cold box as coolant;
    removing BOG from the cargo tank in a BOG fuel stream, the BOG fuel stream flowing from a compressor to a BOG heater for use as fuel for a power system of the liquefied gas vessel;
    creating a flow restriction on the BOG fuel stream to cause a portion of the BOG stream to flow through the cold box for recondensation;
    returning non-condensable gas from the cold box to the BOG fuel stream; and
    combining recondensed BOG from the cold box and the portion of the liquefied gas feed stream exiting the cold box with the feed stream of liquefied gas flowing to the regasifier.

2. The method of claim 1, wherein the liquefied gas is LNG and the regasifier is onboard a deck of the liquefied gas vessel.

3. The method of claim 1, wherein the regasifier is located on a jetty at which the liquefied gas vessel is moored or on another vessel.

\* \* \* \* \*